(12) United States Patent
Taber

(10) Patent No.: US 7,261,409 B1
(45) Date of Patent: Aug. 28, 2007

(54) EYEGLASS FRAME WITH INTEGRAL CHANNEL TO RECEIVE DECORATIVE INSERTS

(76) Inventor: John A. (Jack) Taber, 1801 SW. Hunter's Club Way, Palm City, FL (US) 34990

( * ) Notice: Subject to any disclaimer, the term of this patent is extended or adjusted under 35 U.S.C. 154(b) by 0 days.

(21) Appl. No.: 11/648,295

(22) Filed: Dec. 29, 2006

(51) Int. Cl.
*G02C 11/02* (2006.01)

(52) U.S. Cl. .......................... 351/52; 351/51

(58) Field of Classification Search .............. 351/52, 351/51, 41, 158, 111, 121
See application file for complete search history.

(56) References Cited

U.S. PATENT DOCUMENTS

| | | | | |
|---|---|---|---|---|
| 2,842,028 | A | * | 7/1958 | Belgard ........................ 351/52 |
| 3,021,753 | A | | 2/1962 | Vinson ........................... 88/41 |
| 3,582,192 | A | * | 6/1971 | Gitlin et al. ................... 351/52 |
| 4,806,008 | A | | 2/1989 | Tarloff ......................... 351/51 |
| 4,877,320 | A | | 10/1989 | Holden ......................... 351/44 |
| 4,958,923 | A | | 9/1990 | Rosenson ...................... 351/52 |
| 4,986,647 | A | | 1/1991 | Blumenthal ................... 351/51 |
| 5,033,836 | A | | 7/1991 | Aoyama ........................ 351/51 |
| 5,231,429 | A | | 7/1993 | Kanda .......................... 351/68 |
| 5,233,371 | A | | 8/1993 | Guillet ........................ 351/111 |
| 5,627,607 | A | * | 5/1997 | Grau ............................ 351/52 |
| 6,513,925 | B1 | * | 2/2003 | Bonacci ........................ 351/43 |
| 6,652,093 | B1 | | 11/2003 | Lamy ........................... 351/51 |

OTHER PUBLICATIONS

U.S. Appl. No. 8,900,801, filed Aug. 23, 1990, Kosan.
Publication No. GB 2 180 664 A by Mikkelsen on Apr. 1, 1987.
PCT/JP89/00801 by Kosan on Aug. 23, 1990.

* cited by examiner

*Primary Examiner*—Hung Xuan Dang
(74) *Attorney, Agent, or Firm*—Waddey & Patterson; Mark J. Patterson; Howard H. Bayless

(57) ABSTRACT

A decorative eyeglass having a pair of temple frames adapted to receive an interchangeable temple insert with a decorative insert attached thereon. A flanged channel disposed in the temple bar of the temple frame is adapted to receive the temple insert through an end opening disposed in the proximal end of the temple frame. The temple insert includes a perimeter ridge rising above a central recessed surface adapted to receive the decorative insert and a flat temple end protecting the edges of the decorative insert from fraying and wear. The perimeter flanges of the temple insert prevent the temple insert from entering or exiting the channel via the side opening. Insertion and removal of the temple insert is accomplished by rotating the temple frame relative to the lens frame so as to expose the end opening. With the desired temple insert fully inserted into the channel, the temple frame may be rotated so as to block the end opening by the lens frame. A coordinated apparel system includes the eyeglass frame with a selected temple insert and decorative insert selected from a plurality of temple inserts each having a decorative insert displaying an ornamental feature wherein the decorative insert is selected such that the ornamental features of the decorative insert are matched and coordinated with the ornamental feature of a item of decorative apparel.

19 Claims, 5 Drawing Sheets

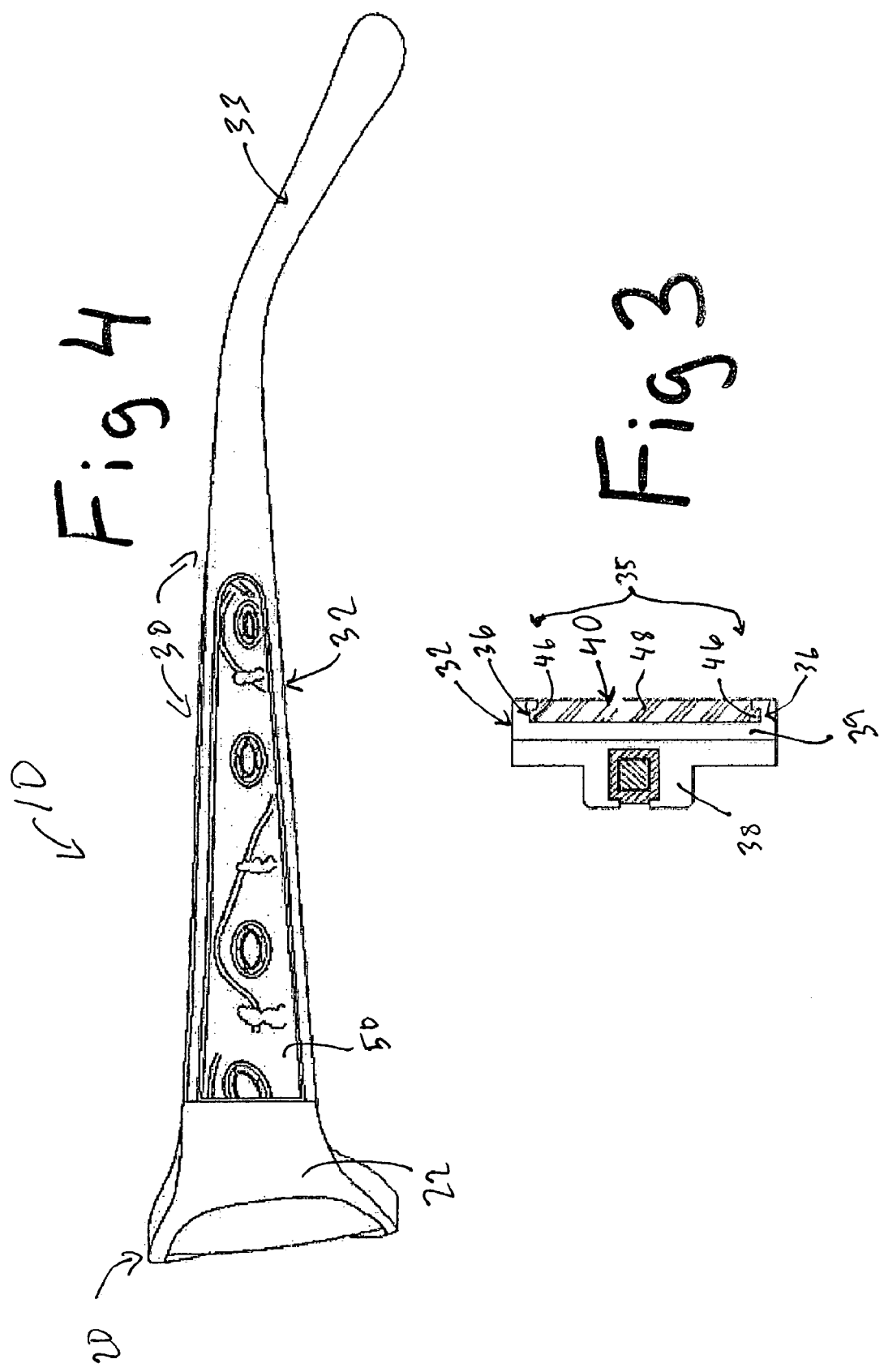

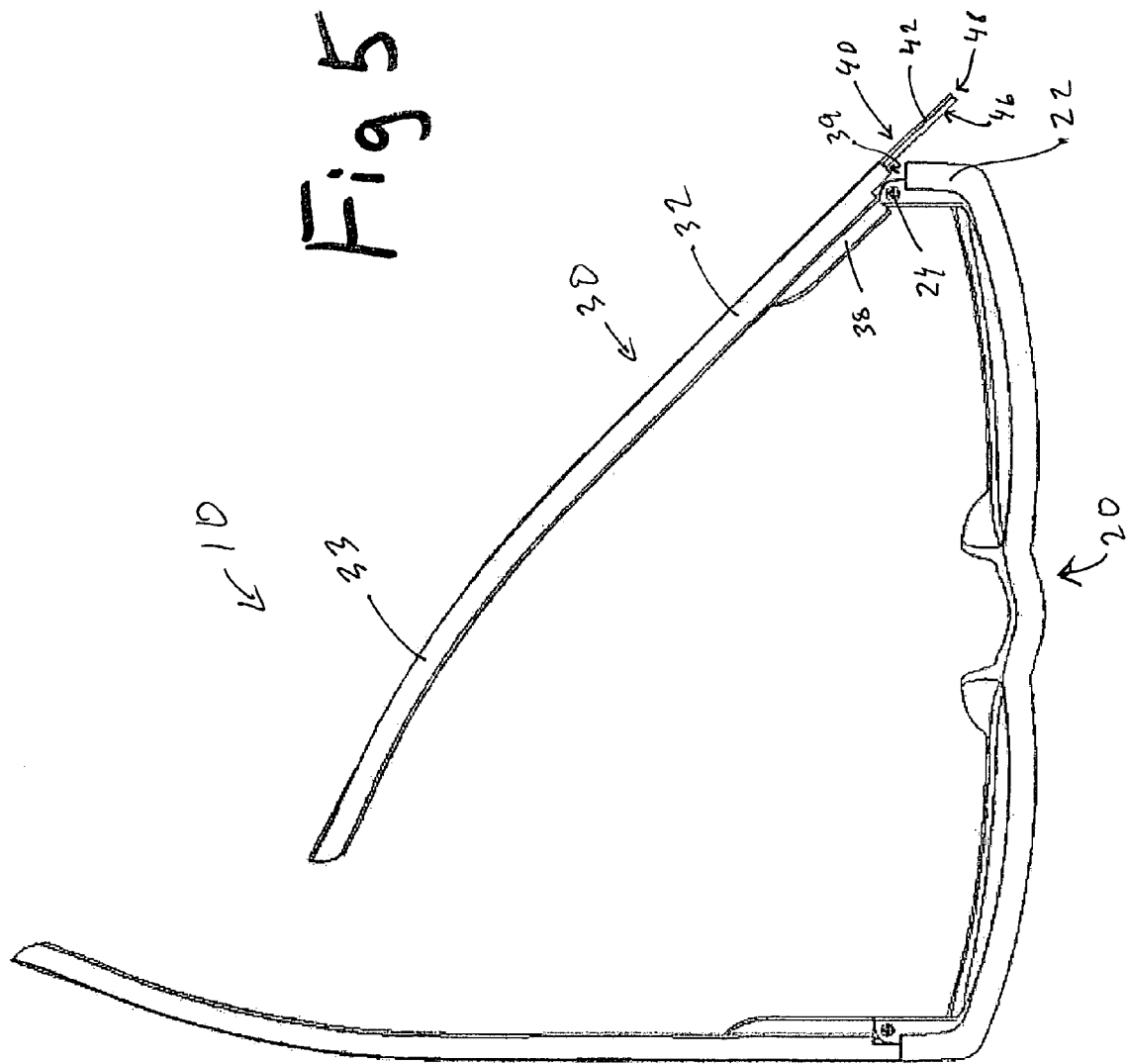

EYEGLASS FRAME WITH INTEGRAL CHANNEL TO RECEIVE DECORATIVE INSERTS

BACKGROUND OF THE INVENTION

The present invention relates generally to the field of eyeglasses worn for vision correction, for reduction of glare or for recreational activities. More particularly, this invention pertains to foldable eyeglass frames having decorative ornamentation displayed on the side pieces of the frame.

It is known in the prior art to embellish such eyeglass frames by providing decorative elements on the side pieces, such side pieces herein termed temple frames. It is also known in the prior art to select eyeglass frames according to their decorative elements so as to match the decorative elements of other apparel worn by the user.

As examples, U.S. Pat. No. 6,652,093 and PCT Publications WO 98/23994 and WO 97/44699 each describe an eyeglass frame structure comprising a decorative element of a temple frame that is mounted in a manner such that the decorative element can rotate with respect to the fixed parts of the temple frame from one position in which one decorative aspect of the decorative element is visible to a position in which another decorative aspect of the decorative element is visible.

Additionally, U.S. Pat. No. 2,842,028 teaches a plastic eyeglass frame having strengthening or decorative inlays permanently fixed into a rectangular cut channel disposed in a temple frame by adhesive. U.S. Pat. No. 5,033,836 describes an eyeglass frame including a front piece, herein termed a lens frame, having replaceable ornamental lateral extensions to which the temple frame is attached by a hinge means.

One disadvantage of these prior art eyeglass frames is the inability to interchange the decorative designs of the temple frames. Users concerned with using eyeglasses as a fashion accessory consider this a significant shortcoming of the prior art requiring the purchase of additional eyeglass frames in order for the users to effectively coordinate their decorative eyeglasses with their multiple pieces of apparel.

What is needed, then, is an eyeglass frame with rapidly interchangeable decorative inserts that can be easily installed upon and removed from the temple frame without the use of tools other than the user's hands. Such decorative inserts should be as separate, inexpensive and interchangeable parts available in a wide variety of decorative patterns, textures, colors or other variable ornamental features.

BRIEF SUMMARY OF THE INVENTION

One embodiment of the decorative eyeglass frame of the present invention includes a lens frame rotably connected to a pair of temple frames, which is adapted to receive a temple insert having a decorative insert attached thereon. The temple frame includes a temple bar and a channel for receiving the temple insert. The channel includes an end opening disposed in the proximal end of the temple frame and further includes a side opening disposed in the side of the temple bar. The channel is adapted to receive an interchangeable temple insert through the end opening. A flange channel is disposed along the perimeter of the lower portion of the channel and receives a perimeter flange extending along the sides of the temple insert. The temple insert includes a perimeter ridge rising above a central recessed surface adapted to receive the decorative insert. The temple insert also includes a temple end, which is preferably flat so as to be flush with the lateral extension of the lens frame when the temple frame is rotated such that the eyeglass frame is in the configuration adapted to fit the face of the user.

The decorative insert of one embodiment includes an ornamental fabric affixed upon the recessed surface of the temple insert. In other embodiments, the decorative insert may include an ornamental material, such as jewels, cloisonné' and/or fabric. In yet other embodiments the decorative insert includes an ornamental surface having a design, decorative pattern, and/or decorative color. In still yet other embodiments, the decorative insert is formed integral to the temple insert.

Advantageously, the decorative insert is sized and shaped so as to closely fit the perimeter ridge rising above a central recessed surface. This feature of the invention protects the edges of the decorative insert from fraying and wear.

The temple insert is inserted into the channel through an end opening disposed in the proximal end of the temple frame. The perimeter flanges of the temple insert are received and held in the flange channel of the temple bar so as to prevent the temple insert from entering or exiting the channel via the side opening. Insertion and removal of the temple insert is accomplished by rotating the temple frame relative to the lens frame so as to expose the end opening. A temple insert may then be inserted or removed from the channel via the end opening.

With the desired temple insert fully inserted into the channel, the temple frame may be rotated so as to block the end opening by the lens frame. In this configuration the temple insert can not be removed from the channel and is securely held within the channel.

Advantageously, with the temple frame fully extended from the lens frame so as to be in a configuration for wearing by the user, the temple insert can not be removed from the channel nor are the temple end of the insert and proximal end of the temple frame visible. But, by simple rotation of the temple frame, the selected insert can be quickly removed and replaced in a just a few seconds and without the use of tools. This feature of the present invention provides a distinct advantage over the prior art methods of installing a decorative element.

One embodiment of the present invention is a coordinated apparel system that includes an eyeglass frame and an item of decorative apparel displaying an ornamental feature. The eyeglass frame of the coordinated apparel system includes a selected temple insert and decorative insert selected from a plurality of temple inserts each having a decorative insert displaying an ornamental feature. According to the present invention, the temple insert with its decorative insert is selected such that the ornamental features of the decorative insert are matched and coordinated with the ornamental feature of the decorative apparel.

BRIEF DESCRIPTION OF THE SEVERAL VIEWS OF THE DRAWINGS

FIG. 3 is a cross-sectional view of the temple frame of the eyeglass frame of FIG. 1.

FIG. 4 is a lateral view of the eyeglass frame of FIG. 1.

FIG. 5 is an overhead view of the eyeglass frame of FIG. 1.

DETAILED DESCRIPTION OF THE INVENTION

Figure 1:
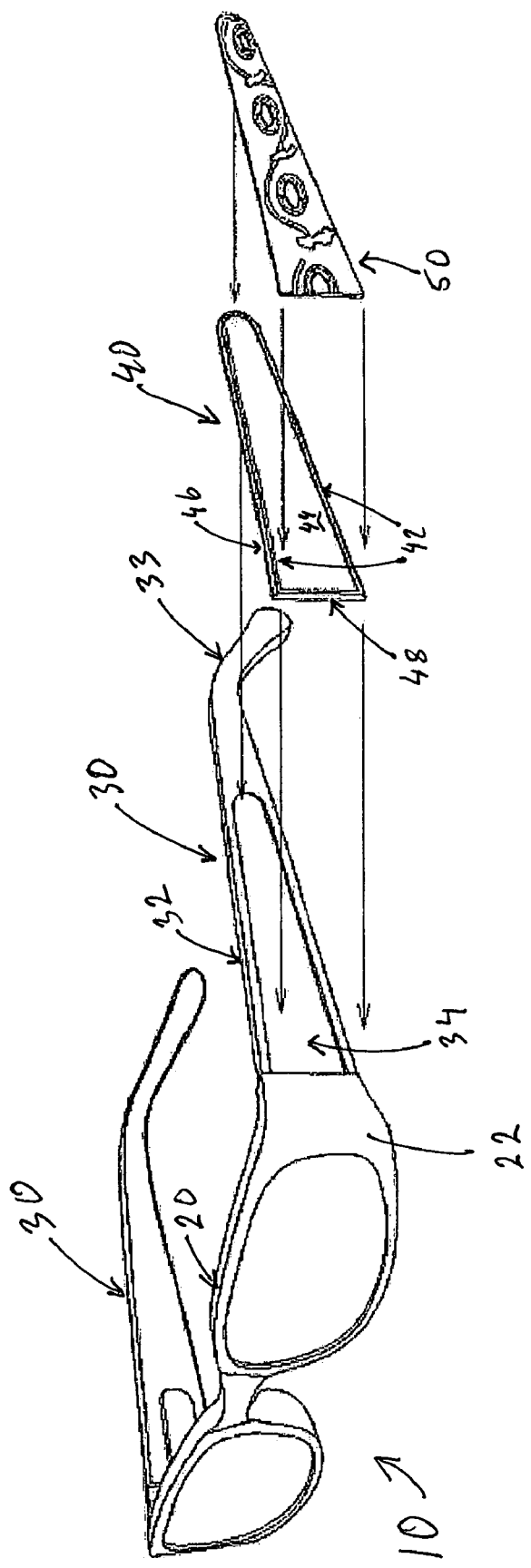
FIG. 1 is an exploded, oblique view of one embodiment of the eyeglass frame of the present invention.

One embodiment of eyeglass frame of the present invention is shown in FIGS. 1-5. Referring to FIG. 1, an eyeglass frame 10 of the present invention is shown in an exploded view and includes a lens frame 20 rotably connected to a pair of temple frames 30. Temple frame 30 is adapted to receive a temple insert 40, which has a decorative insert 50 attached thereon. The lens frame 20 of the embodiment shown in FIG. 1 includes a lateral extension 22 attached via a hinge (not shown) to one temple frame 30. The temple frame 30 includes a temple bar 32 extending from the lateral extension 22 and terminating in an ear hook 33, which is adapted to conform to the ear of the user.

Figure 2:
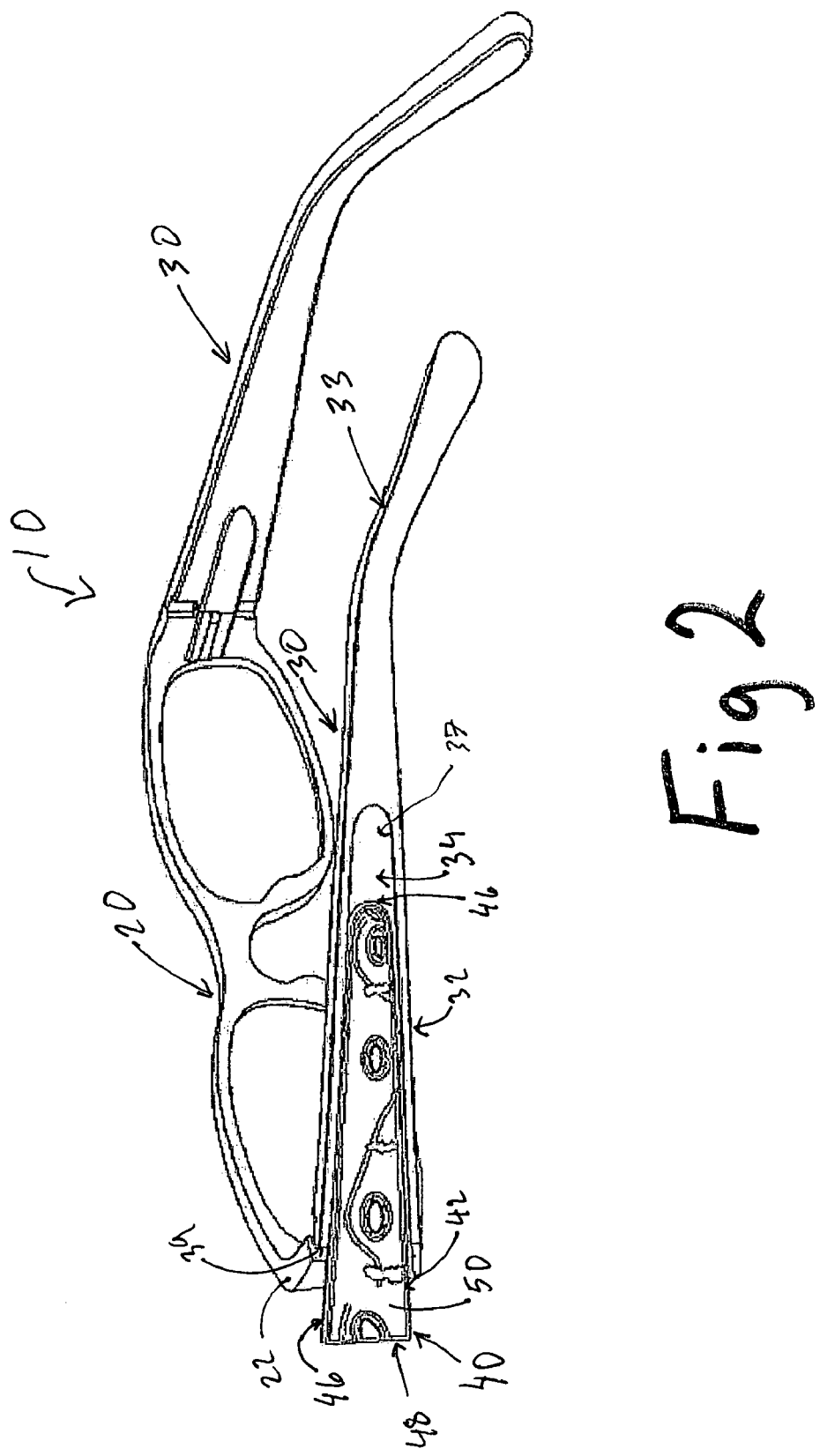
FIG. 2 is a rear oblique view of the eyeglass frame of FIG. 1.

A channel 34 is disposed in the temple bar 32, as is shown in FIGS. 1 and 2. The channel 34 includes an end opening 35 disposed in the proximal end 39 of the temple frame 20 and further includes the side opening 37 disposed in the side of the temple bar 32. The channel 34 is adapted to receive a temple insert 40 through the end opening 35, as shown on FIG. 3. In one embodiment, the channel 34 further includes a flange channel 36 disposed along the perimeter of the lower portion of the channel 34. In another embodiment (not shown), the channel is undercut and the sides of the temple insert sloped so as to form a dovetail between channel walls and the temple insert. Other configurations forming a channel and a close fitting temple insert would be obvious to one skilled in the art and are contemplated by the present invention.

The temple insert 40 of the embodiment is shown in FIG. 1 and includes a perimeter ridge 42 rising above a central recessed surface 44. A perimeter flange 46 extends from the sides of the temple insert 40 and is received and held by the flange channel 36 (FIG. 3) formed in the wall of the channel 34. The temple insert 40 includes a temple end 48, which is preferably flat so as to be flush with the lateral extension 22 of the lens frame 20 when the temple frame 30 is rotated such that the eyeglass frame 10 is in the configuration adapted to fit the face of the user.

Referring again to FIGS. 1, 2 and 4, a decorative insert 50 of one embodiment is inserted upon the recessed surface 44 of the temple insert 40, and is held in place by adhesive, sewing, stapling, bradding, press-fitting or any other conventional means of affixing the decorative insert 50 to the temple insert 40. In the embodiment shown in FIGS. 1 through 5, the decorative insert includes an ornamental fabric displaying an ornamental feature. In other embodiments (not shown) the decorative insert may include an ornamental material displaying an ornamental feature. Such ornamental materials may include jewels, cloisonné', fabric or other well known ornamental materials. Other preferred embodiments (not shown) of the decorative insert may include an ornamental surface displaying an ornamental feature, such ornamental surfaces may include a design, decorative pattern, decorative color or other well known ornamental surfaces. In yet other embodiments (not shown), the decorative insert is formed integral to the temple insert.

Advantageously, the decorative insert 50 is sized and shaped so as to closely fit the perimeter ridge 42 rising above a central recessed surface 44. This feature of the invention protects the edges of the decorative insert 50 from fraying and wear.

Referring now to FIG. 3, a cross-sectional view of the proximal end 39 of the temple frame 30 of one preferred embodiment is shown with the temple insert 40 inserted through the end opening 35 and into the channel 34. The perimeter flanges 46 of the temple insert 40 are received and held in the flange channel 36 of the temple bar 32 so as to prevent the temple insert from entering or exiting the channel 34 via the side opening 37. Referring now to FIGS. 2, 3 and 4, a hinge retainer 38 is attached to the main portion of the temple bar 32 so as to connect the temple frame 30 to the lens frame 20. Advantageously, with the temple frame 30 fully extended from the lens frame 20 so as to be in a configuration for wearing by the user, the temple insert 40 can not be removed from the channel 34.

Referring now to FIGS. 2 and 5, the insertion and removal of the temple insert 40 into the channel 34 of the temple frame 30 is accomplished by rotating the temple frame 30 relative to the lens frame 20 such that the temple frame 30 is disposed along side the lens frame 20. This configuration of the eyeglass frame 10 exposes the end opening 35. A temple insert 40 may then be inserted or removed from the channel 34 of the temple frame 30 via the end opening 35.

With the desired temple insert 40 fully inserted into the channel 34, the temple frame 30 may be rotated upon the hinge 24 so as to abut the proximal end 39 of the temple frame to the lateral extension 22 of the lens frame 20. In this position, the end opening 35 of the channel 34 is blocked by the lens frame 20 and the temple insert 40 can not be removed from the channel 34. Thus, the temple insert 40 having a selected decorative insert 50 displaying an ornamental feature is securely held within the channel 34, but can be quickly removed and replaced, as desired, with temple insert 40 having a decorative insert 50 displaying a different ornamental feature.

The present invention allows easy removal or insertion of a temple insert 40, along with its decorative insert 50, in a just a few seconds and without the use of tools. This feature of the present invention provides a distinct advantage over the prior art methods of installing a decorative element. One skilled in the art would recognize that multiple temple inserts, each with a decorative insert displaying a distinct ornamental feature, may be interchangeably inserted into and used with a single eyeglass frame 10.

Figure 6:
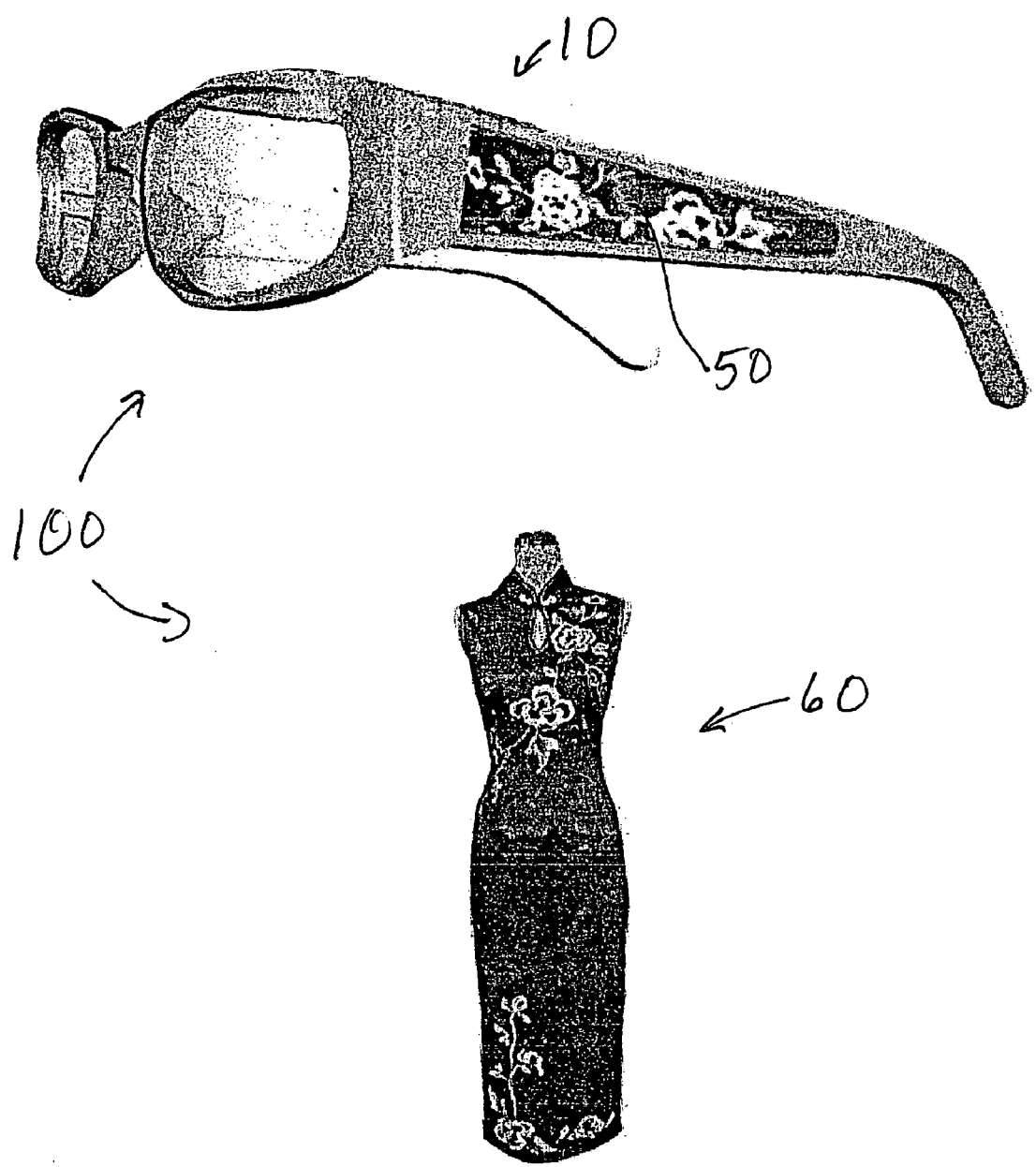
FIG. 6 is one embodiment of the coordinated apparel system of the present invention including the eyeglass frame of FIG. 1.

Referring now to FIG. 6, one embodiment of a coordinated apparel system 100 of the present invention is shown. The coordinated apparel system 100 includes an eyeglass frame 10 and an item of decorative apparel 60 displaying an ornamental feature. In the embodiment of the coordinated apparel system 100 shown in FIG. 6, the item of decorative apparel 60 is a dress displaying an ornate pattern. The eyeglass frame 10 includes a selected temple insert 40 and decorative insert 50 received in the eyeglass frame 10 as described above. The temple insert 40 with its decorative insert 50 is selected from a plurality of temple inserts (not shown), each such temple insert having a decorative insert (not shown) displaying an ornamental feature. According to the present invention the temple insert 40 with its decorative insert 50 is selected such that the ornamental features of the decorative insert 50 are matched and coordinated with the ornamental feature of the decorative apparel 60 selected by the user.

Thus, although there have been described particular embodiments of the present invention of a new and useful Eyeglass Frame with Integral Channel to Receive Decorative Inserts, it is not intended that such references be construed as limitations upon the scope of this invention except as set forth in the following claims.

What is claimed is:

1. An eyeglass frame comprising:
a lens frame; and
a temple frame including:
- a temple bar having a proximal end;
- an interchangeable temple insert;
- a selected decorative insert disposed on the temple insert; and
- a channel disposed in the temple bar, the channel including an end opening disposed in the proximal end of the temple bar, the end opening adapted to allow insertion and removal of the temple insert within the channel, wherein, the temple frame is rotably attached to the lens frame such that a user may selectively rotate the temple frame relative to the lens frame so as to expose the end opening for insertion or removal of the temple insert within the channel and may selectively rotate the temple frame such that the proximal end of the temple frame is disposed against the lens frame so as to cover the end opening preventing insertion or removal of the temple insert from the channel.

2. The eyeglass frame of claim 1, wherein the temple insert comprises a recessed surface and wherein the decorative insert is affixed to the recessed surface.

3. The eyeglass frame of claim 2, wherein the temple insert further comprises a perimeter ridge adapted to protect an edge of the decorative insert so as to prevent wear of the decorative insert.

4. The eyeglass frame of claim 3, wherein the decorative insert includes a selected ornamental feature, and
wherein the channel further comprises a side opening disposed along the side of the temple bar such that, with the temple insert received within the channel, the ornamental feature of the decorative insert is displayed through the side opening.

5. The eyeglass frame of claim 3, wherein the decorative insert includes a selected ornamental feature.

6. The eyeglass frame of claim 5, wherein the decorative insert comprises a decorative fabric.

7. The eyeglass frame of claim 5, wherein the decorative insert comprises an ornamental surface.

8. The eyeglass frame of claim 5, wherein the decorative insert is formed integral to the temple insert.

9. The eyeglass frame of claim 1, wherein the temple insert comprises a perimeter flange disposed upon a side of the temple insert, and
wherein the channel further comprises a flange channel disposed so as to receive the perimeter flange upon insertion of the temple insert in the end opening, the flange channel being adapted to prevent removal of the temple insert from the channel other than by means of the end opening.

10. The eyeglass frame of claim 9, wherein the temple insert further comprises a temple end, the temple end adapted to mate flush with the lens frame when the temple frame is rotated such that the lens frame covers the end opening.

11. The eyeglass frame of claim 1 further comprising a hinge rotably joining the temple frame to the lens frame.

12. The eyeglass frame of claim 11, wherein the temple frame further comprises a hinge retainer, the hinge affixed to the hinge retainer.

13. A coordinated apparel system comprising a decorative eyeglass frame including:
a lens frame; and
a temple frame including:
- a temple bar having a proximal end;
- a temple insert selected from a plurality of interchangeable temple inserts, each temple insert including a selected decorative insert disposed on the temple insert, each decorative insert including a selected ornamental feature; and
- a channel disposed in the temple bar, the channel including a side opening disposed along the side of the temple bar such that, with the temple insert received within the channel, the ornamental feature of the decorative insert is displayed through the side opening, the channel further including an end opening disposed in the proximal end of the temple bar, the end opening adapted to allow insertion and removal of the temple insert within the channel, wherein, the temple frame is rotably attached to the lens frame such that a user may selectively rotate the temple frame relative to the lens frame so as to expose the end opening for insertion or removal of the temple insert within the channel and may selectively rotate the temple frame such that the proximal end of the temple frame is disposed against the lens frame so as to cover the end opening preventing insertion or removal of the temple insert from the channel.

14. The system of claim 13, wherein the temple insert comprises a recessed surface and wherein the decorative insert is affixed to the recessed surface, and
wherein the temple insert further comprises a perimeter ridge adapted to protect an edge of the decorative insert so as to prevent wear of the decorative insert.

15. The system of claim 13, further comprising an item of decorative apparel, the item of decorative displaying an apparel ornamental feature that visually coordinates with the ornamental feature of the decorative insert.

16. The system of claim 13, wherein the temple insert comprises a perimeter flange disposed upon a side of the temple insert, and
wherein, the channel further comprises a flange channel disposed so as to receive the perimeter flange upon insertion of the temple insert in the end opening, the flange channel being adapted to prevent removal of the temple insert from the channel other than by means of the end opening.

17. The eyeglass frame of claim 13, wherein the temple insert further comprises a temple end, the temple end adapted to mate flush with the lens frame when the temple frame is rotated such that the lens frame covers the end opening.

18. The eyeglass frame of claim 13 further comprising a hinge rotably joining the temple frame to the lens frame.

19. The eyeglass frame of claim 18, wherein the temple frame further comprises a hinge retainer, the hinge affixed to the hinge retainer.

* * * * *